United States Patent [19]
Broer et al.

[11] Patent Number: 5,808,713
[45] Date of Patent: Sep. 15, 1998

[54] FLAT-PANEL PICTURE DISPLAY DEVICE

[75] Inventors: Dirk J. Broer, Eindhoven; Reinder Smid; Alexander V. Henzen, both of Heerlen, all of Netherlands

[73] Assignee: U.S. Philips Corporation, New York, N.Y.

[21] Appl. No.: 710,625

[22] Filed: Sep. 20, 1996

[30] Foreign Application Priority Data

Sep. 22, 1995 [EP] European Pat. Off. ............. 95202559

[51] Int. Cl.⁶ .................................................. G02F 1/1315
[52] U.S. Cl. ............................... 349/98; 349/65; 349/96; 349/115
[58] Field of Search ............................... 349/98, 113, 74, 349/65, 64, 115

[56] References Cited

U.S. PATENT DOCUMENTS

| 3,960,438 | 6/1976 | Bonne et al. | 349/98 |
| 4,212,048 | 7/1980 | Castleberry | 362/19 |
| 4,266,859 | 5/1981 | Togashi | 349/113 |
| 4,985,809 | 1/1991 | Matsui et al. | 362/31 |
| 5,217,794 | 6/1993 | Schrenk | 428/220 |
| 5,325,218 | 6/1994 | Willet et al. | 349/74 |
| 5,333,072 | 7/1994 | Willet | 349/98 |
| 5,587,816 | 12/1996 | Gunjima et al. | 349/64 |
| 5,627,666 | 5/1997 | Sharp et al. | 349/98 |

FOREIGN PATENT DOCUMENTS

0606940A2  7/1994  European Pat. Off. .......... G02B 5/30

OTHER PUBLICATIONS

"Polarizing Color Filters Made From Cholesteric LC Silicones", by Robert Maurer et al in SID International Symposium, Digest of Technical Papers, May 1990, pp. 110–113.

"Retardation Film for STN–LCDs 'NRF'" of the firm of Nitto Denko in SID '92 Exhibit Guide, Society for Information Display, May 17–22, 1992, pp. 8–13, Boston, Massachusetts, USA.

Primary Examiner—William L. Sikes
Assistant Examiner—Toan Ton
Attorney, Agent, or Firm—Robert J. Kraus

[57] ABSTRACT

Flat-panel picture display device comprising a picture display panel for modulating the state of polarization of polarized light coupled into said panel in conformity with a picture to be displayed. The light is polarized by means of a reflective polarizer which is integrated or not integrated with the picture display panel. At least a part of the picture display panel functions as an optical waveguide, notably for the beam component $b_2$ having the state of polarization which is not suitable for modulation. An analyzer is present at a first surface of the picture display panel. The polarizing means in the form of a reflective polarizer are present at a second surface of the picture display panel, which surface is located opposite the first surface. A light-directing system is present at the surface of the polarizer remote from the picture display panel, which system is used for sending the light leaving the picture display panel at this surface without contributing to the formation of the image to the picture display panel again so that it will as yet have a chance of being converted into light having the desired state of polarization.

14 Claims, 2 Drawing Sheets

FLAT-PANEL PICTURE DISPLAY DEVICE

BACKGROUND OF THE INVENTION

The invention relates to a flat-panel picture display device comprising an optical waveguide provided with integrated polarizing means for polarizing light coupled into the optical waveguide, and further comprising a picture display panel for modulating the state of polarization of the light polarized by the optical waveguide in conformity with picture information to be displayed, an analyzer being present at a first surface of the picture display panel.

A flat-panel picture display device of the type described in the opening paragraph is known, for example, from U.S. Pat. No. 4,212,048. In the picture display device described in this Patent, a picture display panel is illuminated by means of an illumination system which consists of a light source and a wedge-shaped transparent plate which functions as an optical waveguide. The light rays emitted by the light source are coupled in at an end face of the optical waveguide and propagate through the waveguide because they undergo total internal reflection at the interface between optical waveguide and air. Since the angle of incidence of the light rays at the interface of the optical waveguide facing the picture display panel decreases upon each reflection, this angle will be smaller at a given instant than the critical angle and the relevant light rays will leave the optical waveguide. Moreover, the optical waveguide comprises polarizing means in the form of a strip of polarizing material which extends across the thickness of the optical waveguide in the vicinity of the light source. In this way, it is ensured that the light leaving the optical waveguide is polarized.

A drawback of the picture display device described in said US Patent is that substantially 50% of the light supplied by the light source is lost without being able to contribute to the formation of the image, because the polarizer is dichroic and thus absorbs the state of polarization that is unwanted for the picture display panel. A further drawback is that the optical waveguide must be wedge-shaped in order that light can be coupled out at the exit surface of the optical waveguide. Moreover, due to the wedge shape, the optical waveguide is relatively thick and the freedom of design is limited considerably.

SUMMARY OF THE INVENTION

It is an object of the invention to provide a flat-panel picture display device whose thickness is reduced considerably. Moreover, the greater part of unpolarized light coupled into the optical waveguide is converted in the optical waveguide into light having the same state of polarization which is suitable to be modulated with picture information by the picture display panel. Consequently, the picture display device will have an enhanced luminance.

To this end, the flat-panel picture display, device according to the invention is characterized in that at least a part of the picture display panel is the optical waveguide, in that the polarizing means are constituted by a reflective polarizer which is present at a second surface of the picture display panel, which second surface is located opposite the first surface, and in that a light-directing system is present at a surface of the reflective polarizer remote from the picture display panel.

In known flat-panel picture display devices, the optical waveguide generally consists of an optically transparent plate having an average thickness of approximately 1 to 3 mm, while the thickness of the complete flat-panel picture display device including the optical waveguide, is approximately 3 to 7 mm. Since the function of the optical waveguide in the picture display device according to the invention is ensured by the picture display panel, this plate can be omitted so that the thickness of the picture display device is considerably reduced.

Since the polarizing means are constituted by a reflective polarizer, light having the unwanted state of polarization will no longer be absorbed, but this light can be recuperated so that the greater part can as yet be converted into light having the desired state of polarization.

The desired state of polarization is herein understood to mean the state of polarization which is suitable to be modulated with picture information, in contrast to the unwanted state of polarization.

Exiting light is herein understood to mean light which leaves the optical waveguide in an unwanted manner and would not contribute to the formation of the picture if no further measures were taken, independent of the fact whether this light has the desired or the unwanted state of polarization. Light which is coupled out is understood to mean light leaving the optical waveguide with the desired state of polarization in the desired direction and consequently contributing to the formation of the image.

The light-directing system ensures that the light having the desired state of polarization is sent to a modulating part of the device.

The light-directing system may be implemented as a separate component, but may also be provided in direct contact with the picture display panel. The latter possibility is preferred, because then there are fewer material interfaces and thus fewer unwanted reflections.

A preferred embodiment of the flat-panel picture display device according to the invention is characterized in that the light-directing system has a polarization-maintaining effect.

It is not necessary that the light-directing system has a polarization-maintaining effect because the light coming from the system will be presented to the reflective polarizer again, so that only the desired state of polarization will be passed. However, since mainly light having the desired state of polarization is presented to the light-directing system, it is efficient that the light-directing system has a polarization-maintaining effect.

The light-directing system may be implemented in different manners. A first embodiment of the flat-panel picture display device according to the invention is characterized in that the light-directing system is constituted by a reflective structure comprising a plurality of reflective facets which enclose an angle $\Theta$ with the plane of the reflective polarizer.

The beam component passed by the reflective polarizer, in other words, the beam component having the desired state of polarization, will be reflected by the reflective structure. The angle at which reflection takes place is determined by the angle $\Theta$ which the reflective facets enclose with the plane of the reflective polarizer.

The reflective structure may be formed, for example, by providing recesses having the desired shape in the surface of the reflective polarizer remote from the picture display panel. The structure may have the shape of, for example, a zigzag pattern or a sawtooth pattern.

A second embodiment of the flat-panel picture display device according to the invention is characterized in that the light-directing system comprises a diffuser and a reflector, the diffuser being present between the reflective polarizer and the reflector.

Due to the presence of the diffuser, a part of an incident beam component having the desired state of polarization will be diffused towards the picture display panel. However, another part will also be diffused away from the picture display panel. To prevent this part from being lost, thereby not contributing to the formation of the picture, the reflector ensures that this light again reaches the picture display panel.

A further embodiment of the flat-panel picture display device according to the invention is characterized in that the reflective polarizer is implemented as a cholesteric polarizer.

A cholesteric polarizer is a polarizer comprising a layer of liquid crystalline material having a cholesteric ordering. In this type of liquid crystalline material, the chiral molecules have such a structure that they spontaneously order in solution to a spiral or helix-like structure. This helix-like structure may be directed in such a way that the axis of the helix will be transverse to the layer.

When unpolarized light is incident on such a layer, the circularly polarized beam component of the light which matches the (dextrorotatary or laevorotatory) direction of rotation of the helix and whose wavelength matches the pitch of the helix will be reflected, whereas the other circularly polarized beam component will be passed.

The reflection bandwidth of a cholesteric layer is given by:

$$\lambda_0 = \frac{1}{2}(n_o + n_e)p$$

in which p is the pitch of the molecular helix and $n_o$ and $n_e$ are the ordinary and the extraordinary refractive index, respectively, of the material of the cholesteric layer. The cholesteric polarizer may comprise a narrow-band cholesteric layer. This means that it has a polarizing effect in a limited wavelength range so that the polarized light will have a colour in conformity with this wavelength range.

A preferred embodiment of the flat-panel picture display device according to the invention is characterized in that the cholesteric polarizer is implemented as a single layer of a liquid crystalline polymer material, within which layer the pitch of the molecular helix varies substantially continuously between two values which correspond to the lower limit and the upper limit, respectively, of the reflection band required to cover the full visible wavelength range.

Since the pitch of the helix varies substantially continuously across the layer, a relatively large reflection bandwidth can be achieved, and it is even possible to cover the full visible wavelength range with a single-layer cholesteric polarizer. The same effect can be achieved by stacking a plurality of cholesteric polarizers each being active in a different wavelength range, so that they jointly cover the visible wavelength range. Another possibility is to vary the pitch of the helix within a plurality of layers of the stack, so that a smaller number of layers will suffice. However, as compared with the two other possibilities mentioned, a single-layer cholesteric polarizer with a varying pitch has the advantage that it is thinner and is less liable to reflection losses, because the interfaces between the several layers are eliminated.

A further advantage of a pitch which is variable across the layer of the polarizer is that the reflection bandwidth can be chosen to be so wide that the band shift which occurs upon light incidence at a large angle with respect to the normal on the polarizer does not have any detrimental influence on the polarizing effect of the cholesteric layer.

For detailed information about the manufacture of a single-layer cholesteric polarizer, reference is made to European Patent Application EP 0 606 940.

A further embodiment of the flat-panel picture display device according to the invention is characterized in that the picture display device comprises an $n.\lambda/4$ plate, in which n is an integral, odd number.

If the picture display panel is adapted to modulate linearly polarized light, an $n.\lambda/4$ plate is present in the picture display device to convert the circularly polarized light from the cholesteric polarizer into linearly polarized light before this light reaches the picture display panel.

Moreover, this $n.\lambda/4$ plate will contribute to the depolarization of the beam component having the unwanted state of polarization which is reflected by the cholesteric polarizer in the picture display panel.

If the picture display panel is adapted to modulate circularly polarized light, the $n.\lambda/4$ plate may be dispensed with.

A further embodiment of the flat-panel picture display device according to the invention is characterized in that the $n.\lambda/4$ plate is present between the cholesteric polarizer and the picture display panel.

The cholesteric polarizer may be, for example, a self-supporting film. If this is not the case, the cholesteric layer should be provided on a substrate. This may be, for example, an optically transparent plate. An advantageous embodiment of the flat-panel picture display device according to the invention is characterized in that the $n.\lambda/4$ plate functions as a substrate for the cholesteric polarizer. By providing the cholesteric layer on the $n.\lambda/4$ plate, a separate substrate may be dispensed with, so that the picture display device can be implemented in a thinner form.

An embodiment of the flat-panel picture display device according to the invention, in which the picture display panel is adapted to modulate linearly polarized light and in which the $n.\lambda/4$ plate may be dispensed with, is characterized in that the reflective polarizer comprises a plurality of layers, at least a number of which comprises birefringent material.

Then it is, for example, possible that all layers comprise birefringent material, or that the layers are alternately birefringent and non-birefringent.

Such a polarizer may be made by means of single-step extrusion. An example of such a polarizer is described extensively in U.S. Pat. No. 5,217,794.

A further embodiment of the flat-panel picture display device according to the invention is characterized in that a depolarizing reflector is arranged on at least one side face remote from a light source.

It is known per se to provide the optical waveguide of an illumination system for a flat-panel picture display device with a reflector at the end faces where no light is coupled in. In this way, it is prevented that light arriving there is lost and thus does not contribute to the luminance of the picture display device. The reflector reflects the light in the optical waveguide, so that this light will have another chance of being converted at least partly into light having the desired state of polarization and of being subsequently coupled out at the exit surface of the optical waveguide.

If a reflector provided at an end face has a depolarizing effect, approximately half of the light incident on the reflector is immediately converted into light having the desired state of polarization. In this way, the depolarization is independent of the birefringence of the material, through which the unwanted beam component propagates.

Another embodiment of the flat-panel picture display device according to the invention is characterized in that the diffuser is a light-diffusing structure provided in the surface of the reflective polarizer.

This structure may be provided in a separate foil, but it may alternatively be provided directly in a surface of the polarizer during manufacture of this polarizer.

Another embodiment of the flat-panel picture display device according to the invention is characterized in that the structure is constituted by a pattern of discrete diffusing areas.

The advantage of such a pattern is that its configuration can be adapted to the desired intensity distribution on the surface of the picture display panel. When light is coupled in, for example, at an end face of the picture display panel, the intensity of this light will decrease as it propagates further remote from this end face, so that the luminance of the device decreases as the distance towards this end face increases. By adapting the pattern of light-diffusing areas, for example, by increasing the density as the distance to the end face opposite to the light source increases, it can be ensured that the intensity distribution on the complete surface of the picture display panel is homogeneous. It is known, for example, from U.S. Pat. No. 4,985,809 to provide a diffuser on the optical waveguide of a flat-panel picture display device in this way.

These and other aspects of the invention will be apparent from and lucidated with reference to the embodiments described hereinafter.

DETAILED DESCRIPTION OF THE PREFERRED EMBODIMENTS

In a great many known flat-panel picture display devices, the light from he light source is coupled into an optical waveguide which is separated from the picture display panel. The optical waveguide is, for example an optically transparent plate, with a light source being present at at least one end face thereof. The light is coupled into the optical waveguide via this end face and is at least partly coupled out of the surface of the optical waveguide directed towards the picture display panel after one or more reflections on the waveguide-air interface of the optical waveguide. The state of polarization of the light which is coupled out is subsequently modulated by the picture display panel in conformity with the picture information to be displayed. The light coupled into the picture display panel is therefore already preferably polarized in advance. To this end, the known flat-panel picture display devices comprise a dichroic polarizer arranged between the picture display panel and the optical waveguide, which polarizer absorbs the greater part of the state of polarization which is unwanted for the picture display panel. Consequently, substantially half of the light supplied by the light source is lost, while the polarizer and the picture display panel are heated.

The present invention proposes to dispense with the extra optical waveguide and to have its function taken over by the picture display panel or a part thereof. In this way, the flat-panel picture display device can be given a very thin form. Moreover, a reflective polarizer, which may be integrated with a picture display panel, is used for polarizing the light emitted by the light source. The light having a state of polarization which is unwanted for the picture display panel can be recuperated by such a polarizer so that a great part can as yet be converted into light having the state of polarization which is desirable for the picture display panel. In this way, a much larger quantity of the light emitted by the light source can be used for the formation of the picture, so that the luminance of the picture display device is enhanced. Moreover, the polarizer or the picture display panel will substantially not be heated.

Figure 1:
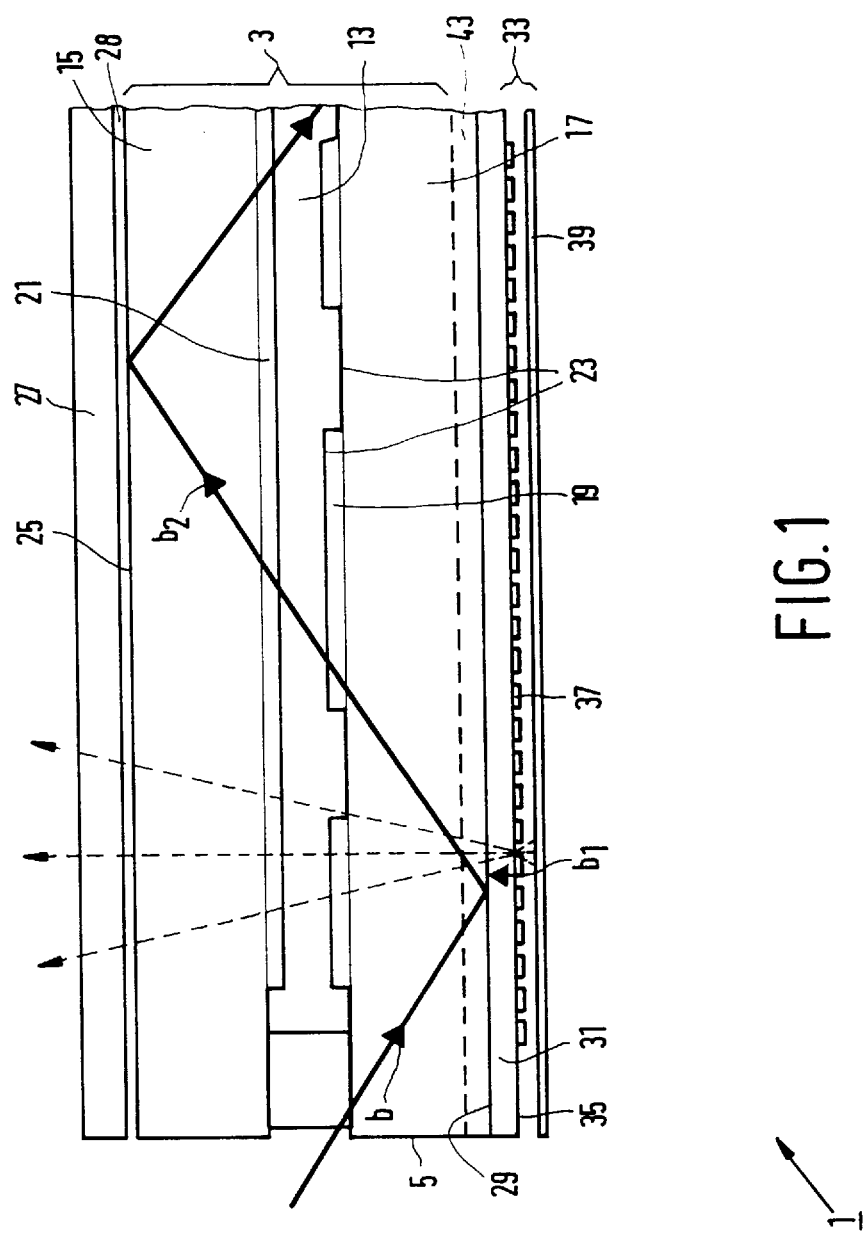
FIGS. 1 and 2 show diagrammatically a first and a second embodiment of part of a flat-panel picture display device according to the invention, with peripheral illumination and the associated path of radiation.
Figure 1:
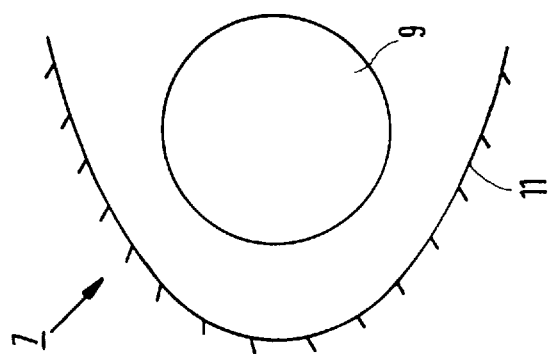

The flat-panel picture display device 1 shown diagrammatically in FIG. 1 comprises a picture display panel 3, while at least at one end face 5 an illumination system 7 is present whose light can be coupled into the picture display panel 3 via this end face 5. The illumination system 7 comprises a light source 9 and an associated reflector 11. The reflector 11 ensures that light emitted by the light source 9 away from the picture display panel 3 is as yet reflected towards the picture display panel 3.

The light source may be, for example, a rod-shaped fluorescence lamp. The light source may alternatively be constituted, for example, by one or more light-emitting diodes (LED), notably in flat-panel picture display devices having a small picture display panel such as, for example, in cellular telephones.

The picture display panel 3 may be formed, for example, by two optically transparent substrates 15, 17, for example, of glass or synthetic material, each provided with an ITO electrode 19, 21 and a polyimide orientation layer 23. An active layer 13 is present between the substrates 15, 17. The active layer 13 may comprise, for example, a liquid crystalline material and be provided with a matrix of pixels whose operation is based on the twisted nematic effect (TN), the super-twisted nematic effect (STN) or the ferro-electric effect so as to modulate the state of polarization of incident light. Moreover, spacer elements (not shown) for realizing and maintaining the desired thickness of the active layer 13 may be present between the two substrates.

A first surface 25 of the picture display panel 3 is provided with an analyzer 27. The analyzer 27 is preferably not in optical contact with the surface 25 so as to avoid conductance of light in the analyzer. This may be realized, for example, by leaving an air gap 28 between the picture display panel 3 and the analyzer 27, or by securing the analyzer 27 to the picture display panel 3 by means of an adhesive having a low refractive index. The analyzer 27 ensures that light coming from those pixels that must appear as dark pixels in the ultimate picture is blocked. A reflective polarizer 31 is present at a second surface 29 opposite the first surface 25.

Light rays which are coupled into the picture display panel 3 via the end face 5 are incident on the surface 29 of the picture display panel 3, at which surface the reflective polarizer 31 is present. The reflective polarizer 31 is adapted in such a way that, when an unpolarized beam b is incident on the polarizer 31, the beam component b, having the state of polarization which is desired for the picture display panel 3 is passed by the polarizer 31, whereas the beam component $b_2$ having the unwanted state of polarization is reflected by the polarizer 31 in the picture display panel 3. The beam component $b_2$ having the unwanted state of polarization will consequently propagate away from the end face 5 in the picture display panel 3. During the propagation, this unwanted beam component $b_2$ will at least partly be depolarized due to birefringence of the material in which the propagation takes place. When the beam component $b_2$ is incident on the reflective polarizer 31, the part having the desired state of polarization will be passed by the polarizer 31. The fact whether there is reflection or no reflection at the surface 25 is determined by the angle at which the light is incident on this surface 25. If the angle of incidence is larger than the critical angle for total internal reflection, the light will be reflected. If the angle of incidence is smaller than this critical angle, the light will exit. When the light exits at the surface 25 near the end face 5, it is very likely that the exiting light will still have the unwanted state of polarization for the picture display panel 3 and will thus not contribute to the formation of the picture. However, the greater part of the beam component having the unwanted state of polarization will cover a relatively long distance in the picture display panel and have undergone depolarization during propagation, so that a large part thereof will still acquire the desired state of polarization and will eventually be passed by the reflective polarizer 31.

The light passed by the reflective polarizer 31 is incident on a light-directing system 33 which is present at the surface 35 of the reflective polarizer 31 remote from the picture display panel 3. The light incident on the light-directing system 33 will at least partly be sent towards the picture display panel 3.

The reflective polarizer may be structured in such a way that it passes the desired state of polarization, so that it can be coupled out via the surface 25, and reflects the unwanted state of polarization so that the greater part can as yet be converted into light having the desired state of polarization due to frequent reflections, diffusion and birefringence of the material of the optical waveguide.

The light-directing system 33 may be implemented in different ways. In a first possibility, shown in FIG. 1, the light-directing system 33 comprises a diffuser 37 and a reflector 39. A part of the light incident on the diffuser is diffused towards the picture display panel, as is denoted by the broken-line arrows, and can be subsequently modulated. Since also a part of the light having the desired state of polarization will be diffused by the diffuser 37 in a direction away from the picture display panel 3, it is advantageous to provide a reflector 39 at the side of the diffuser 37 remote from the polarizer 31, so that this light is also sent towards the picture display panel 3.

The reflector 39 of the light-directing system 33 may be, for example, an aluminium layer or a synthetic material layer having low-absorbing or non-absorbing particles such as, for example, $BaSO_4$ or $TiO_2$.

Figure 2:
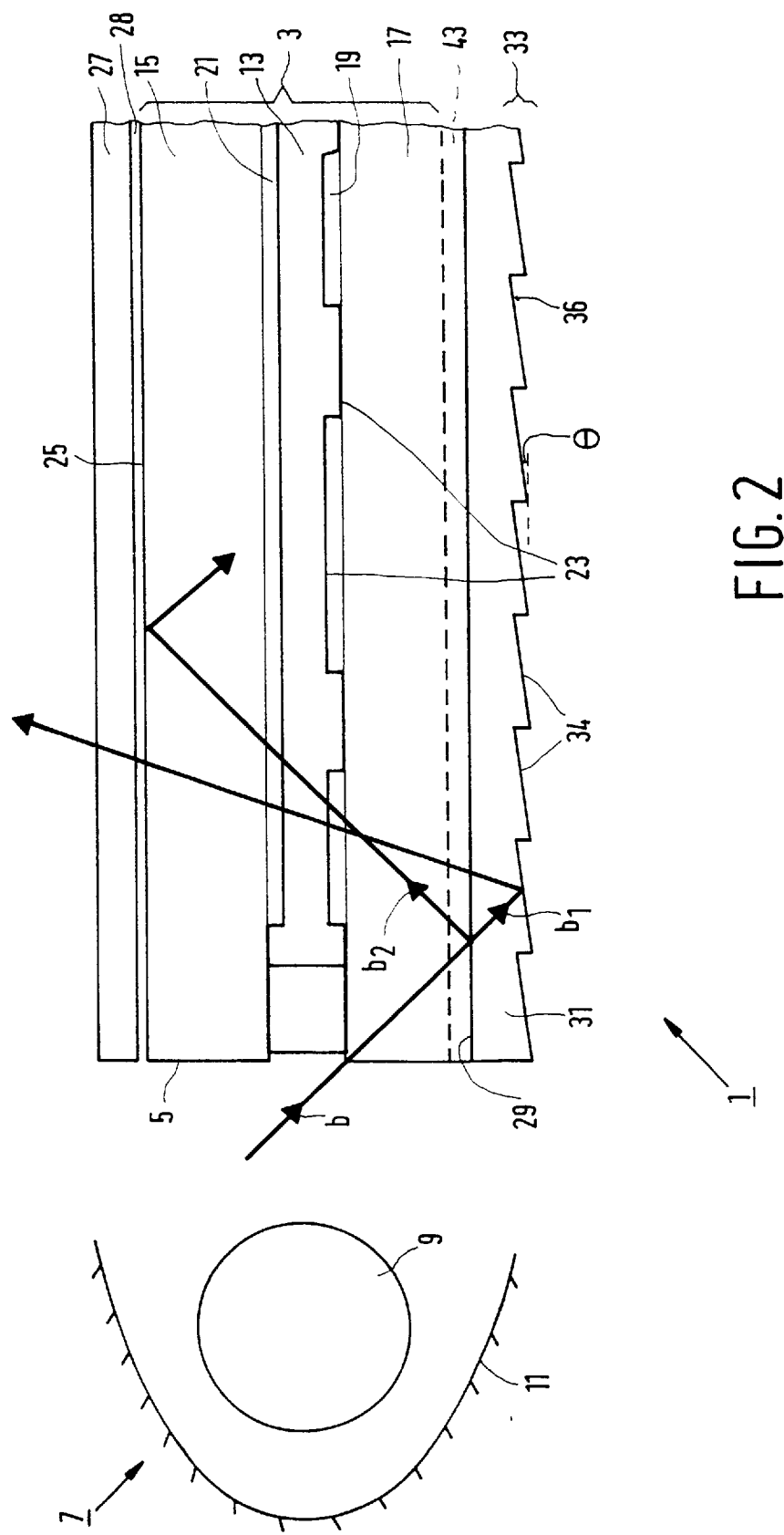

In accordance with a second possibility, the light-directing system 33 has a reflective structure comprising reflective facets 34 which enclose an angle Θ with the plane of the polarizer 31. This possibility is illustrated in FIG. 2. The reflective facets 34 can be realized by providing recesses 36 in the surface of the polarizer 31 remote from the picture display panel. The recesses 36 may also be provided in a separate transparent plate which is subsequently provided on this surface. The angle e which the facets enclose with the plane of the polarizer 31 determines the angle at which incident light is reflected to the picture display panel 3. The structure may have the shape of, for example, a zigzag pattern or a sawtooth pattern.

The light-directing system 33 preferably has a polarization-maintaining effect because the greater part of the light passed by the polarizer 31 has the desired state of polarization. However, it is not necessary that the system 33 has a polarization-maintaining effect, because the light sent by the system 33 to the picture display panel 3 must pass the reflective polarizer 31 anyway, which polarizer only passes the light having the desired state of polarization. However, it is more efficient when the desired state of polarization is maintained.

In the embodiments illustrated and described hereinbefore, the complete picture display panel 3 functions as the optical waveguide. However, it is alternatively possible to use, for example, only the substrate 17 as an optical waveguide, which substrate serves as the bottom plate. In that case, a layer (not shown) having a low refractive index, for example, an $SiO_2$ layer is to be provided between the substrate 17 and the active layer 13 in order that the beam component having the unwanted state of polarization can be reflected on this surface.

Instead of coupling light into the picture display panel 3 at only one end face 5, two or more illumination systems may be used, so that light is coupled into two or more side faces of the picture display panel 3. If the light source 9 is a rod-shaped lamp, it is sufficient to use a single rod-shaped lamp which has a number of bends and can consequently illuminate a number of side faces simultaneously. By illuminating more than one end face, a greater luminance and a more homogeneous intensity of the light which is coupled out is achieved. Moreover, the use of a single rod-shaped lamp having a number of bends enhances the efficiency of the illumination system, because the losses in a rod-shaped fluorescence lamp decrease with an increasing length of the lamp.

The end faces or side faces of the picture display panel into which the light is coupled can be implemented in such a way that the light is coupled in more efficiently. A better coupling in of light can be obtained, for example by polishing the relevant end faces, by smoothing the surface of the end face by means of a layer having an adapted refractive index, or by providing a curvature having a lens action in such a layer, or by providing an optical coupling between the light source and the picture display panel.

The reflective polarizer 31 may be implemented in different ways. In a first embodiment, the polarizer 31 comprises a layer of liquid crystalline material having a cholesteric ordering. In this type of liquid crystalline material, the chiral molecules have a spiral or helix-like structure having a pitch p. This helix-like structure may be directed in such a way that the axis of the helix will be transverse to the layer.

When unpolarized light is incident on such a layer, the circularly polarized beam component of the light which matches the (dextrorotatary or laevorotatory) direction of rotation of the helix and whose wavelength matches the pitch p of the helix will be reflected, whereas the other circularly polarized beam component will be passed. The reflection bandwidth $\lambda_o$ of a cholesteric layer is given by:

$$\lambda_o = \tfrac{1}{2}(n_o + n_e)p$$

Herein, p is the pitch of the molecular helix and $n_o$ and $n_e$ are the ordinary and the extraordinary refractive index, respectively, of the liquid crystalline material.

The cholesteric polarizer may consist of a cholesteric layer having a limited reflection band. The polarized light will then have a given colour whose wavelength corresponds to the pitch p of the molecular helix of the cholesteric layer.

The cholesteric polarizer may alternatively be composed of a plurality of layers within which the pitch is constant, but in which each layer is active in a different wavelength range. The different wavelength ranges may be chosen to be such that all layers combined cover the full visible wavelength range. In this way, it is possible to use the flat-panel picture display device as a colour picture display device.

The cholesteric polarizer preferably consists of a single layer of liquid crystalline material in which the pitch of the molecular helix varies substantially continuously between two values which correspond to the lower limit and the upper limit, respectively, of the reflection band which is required to cover the full visible wavelength range (between 400 and 780 nm). In this way, it is sufficient to use a much thinner polarizer than in the case of stacked layers. A further advantage is that a single-layer polarizer has a better optical quality. The quality of cholesteric polarizers decreases with an increasing number of layers due to errors which are typical of cholesterics. Moreover, the range of angles of incidence of light to be polarized, within which the polarizer is effective, decreases with an increasing thickness. An advantage of a polarizer consisting of a single cholesteric layer is that the bandwidth can be chosen to be such that the band shift which occurs upon light incidence at a large angle with respect to the normal on the polarizer has no detrimental influence on the polarizing effect. For example, for an angle of incidence of 80° and for reflection of light in the wavelength range between 400 and 700 nm, the polarizer should have a reflection bandwidth of between 400 and 890 nm.

Another possibility of manufacturing a cholesteric polarizer is to stack a plurality of cholesteric layers, at least a number of which have a pitch which varies substantially continuously across the layer thickness. In this way, it is sufficient to use a smaller number of layers than in the first-mentioned case.

It is to be noted that it is known per se that cholesteric layers are used as polarizers, for example, from the article "Polarizing Color Filters made from Cholesteric LC Silicones" by R. Maurer et al. in SID International Symposium, Digest of Technical Papers, May 1990, pp. 110–113.

A cholesteric polarizer divides unpolarized light into oppositely circularly polarized beam components. A reflective polarizer which splits up unpolarized light into linearly polarized beam components comprises, for example, a stack of layers, at least a number of which is birefringent. The stack may comprise layers which are alternately birefringent and non-birefringent. Alternatively, all layers may comprise birefringent material. Such a polarizer may be manufactured, for example, by means of single-step extrusion, an example of which has been extensively described in U.S. Pat. No. 5,217,794.

If the reflective polarizer is a cholesteric polarizer and the picture display panel is adapted to modulate linearly polarized light, the picture display device 1 should further comprise an n.λ/4 plate 43, with n being an odd integer, so as to convert the light which is circularly polarized by the cholesteric polarizer into linearly polarized light before it is modulated by the picture display panel. This n.λ/4 plate preferably has a wide band. Moreover, the n.λ/4 plate may contribute to the depolarization of the unwanted beam component which is reflected by the reflective polarizer 31 in the picture display panel 3.

A wideband λ/4 plate is a transparent element which is composed of, for example, different layers and realizes such a phase rotation in a beam for all wavelengths in the visible wavelength range that circularly polarized light is converted into linearly polarized light. Such a λ/4 plate is known, for example, from the article "Retardation Film for STN-LCDs 'NRF'" of the firm of Nitto Denko in SID '92 Exhibit Guide, Society for Information Display, May 17–22, 1992, Boston, Mass., USA.

The n.λ/4 plate 43 may be present, for example, between the picture display panel 3 and the cholesteric polarizer 31. The cholesteric layer may be implemented as a self-supporting film. If this is not the case, the cholesteric layer must be provided on a separate substrate, for example, an optically transparent plate. However, the cholesteric layer may be provided on the λ/4 plate so that the extra substrate can be dispensed with and, consequently, the picture display device can be given a thinner form.

If the reflective polarizer is a cholesteric polarizer and the picture display panel 3 is adapted to modulate circularly polarized light, the λ/4 plate may be dispensed with.

The λ/4 plate may also be dispensed with if the polarizer is a linear polarizer and the picture display panel is suitable for modulating linearly polarized light.

Since the λ/4 plate may be dispensed with in some cases, it is shown by means of a broken line in the Figures.

If the picture display device 3 does not comprise a λ/4 plate, the beam component having the unwanted state of polarization is depolarized only by the picture display panel. In the opposite case, there will also be depolarization in the λ/4 plate.

The depolarization of the beam component having the unwanted state of polarization can be ensured by providing one or more side faces of the picture display panel 3 in which no light is coupled with a depolarizing reflector (not shown). It is known per se to provide the side faces of the optical waveguide in which no light coupling takes place with a reflector in flat-panel picture display devices so as to prevent light arriving there from being lost, thereby not contributing to the formation of the picture. The reflector reflects the light in the optical waveguide so that it will have another chance of being converted at least partly into light having the desired state of polarization. If this reflector depolarizes, substantially half of this beam component is immediately converted into light having the desired state of polarization, so that it will be passed by the reflective polarizer and reach the picture display panel in the manner described hereinbefore.

The diffuser 37, which may form part of the light-directing system 33, may also be implemented in different ways. The diffuser 37 may be a foil which is provided on the surface 35 of the reflective polarizer 31. The foil may consist of a synthetic material layer, for example PMMA, in which $SiO_2$ or polyethylene oxide particles are present. Instead of comprising particles, the foil may be provided with a surface texture. The diffuser 37 may alternatively be provided directly on the surface 35 of the reflective polarizer 31 itself. This may be realized, for example, by mechanically roughening the surface 35 or by providing the desired diffusing structure in the surface 35 of the polarizer 31 after manufacture of the polarizer 31, using a hot die or a replica technique.

The diffuser 37 may alternatively be a two-dimensional pattern of light-diffusing areas which are provided on the surface 35 of the polarizer 31, for example, by means of silkscreen printing. The advantage of such a pattern is that its configuration can be adapted in such a way that the intensity distribution across the surface 29 of the picture display panel is as homogeneous as possible. In fact, as the distance in the picture display panel 3 to the end face 5 in which the light is coupled increases, the intensity of the light having the desired state of polarization will decrease. This phenomenon may be compensated by raising the density of the diffusing areas with an increasing distance to the light source. The principle of varying the density of a diffusing pattern of dots in order to homogenize the intensity distribution in flat panel picture display devices is known, for example, from United States Patent U.S. Pat. No. 4,985,809.

An advantage of the flat-panel picture display device described hereinbefore is that the peripheral illumination system is not necessary when there is sufficient ambient light. In fact, the flat-panel picture display device is also suitable for functioning with ambient light. This particularly applies to small displays in which a relatively low light output and a relatively low contrast are sufficient as in, for example, cellular telephones. Approximately half the ambient light is blocked by the analyzer 27. In the energized state, for example, a pixel of the picture display panel 3 will leave the state of polarization of the incident beam component unchanged, so that the beam component passed by the analyzer 27 arrives at the reflective polarizer 31 in this state of polarization and is reflected there, because the polarizer 31 and the analyzer 27 generally have complementary states of polarization. The light coming from this pixel will then give rise to a luminous part in the picture. For an unenergized pixel, the state of polarization of the light passed by the analyzer 27 will be influenced. Consequently, this light will at least partly be passed by the reflective polarizer 31 towards the light-directing system 33, at which not only reflection or diffusion and reflection but also depolarization occurs because this light should lead to the dark parts of the picture. If a flat-panel picture display device which can also function with ambient light is desired, the advantage of the thin picture display device is maintained because the picture display panel serves as an optical waveguide, but this is at the expense of luminance and contrast so as to realize an acceptable contrast if the ambient light is used for the illumination.

What is claimed is:

1. A flat-panel picture display device, comprising:
   a picture display panel which includes an integral optical waveguide having opposite first and second major surfaces, a first end face which is positioned to receive polarized light, a second end face opposite the first end face, and means for modulating the state of polarization of the received polarized light in accordance with picture information to be displayed;
   an analyzer proximate the first major surface;
   a reflective polarizer proximate the second major surface;
   a light directing system proximate a major surface of the reflective polarizer which is remote from the picture display panel;
   wherein the reflective polarizer allows a first portion of the received polarized light having a desired state of polarization to pass therethrough and reflects a second portion of the received polarized light having an unwanted state of polarization;
   wherein the reflected second portion of the received polarized light propagates through the optical waveguide in a direction away from the first end face of the optical waveguide, whereby at least a portion of the second portion which propagates through the optical waveguide will be depolarized due to birefringence of the optical waveguide and eventually transformed into the desired state of polarization for passage through the reflective polarizer; and,
   wherein the light directing system is configured to at least partially reflect the first portion of the received polarized light and the at least a portion of the second portion of the received polarized light which is transformed into the desired state of polarization, towards the picture display panel, for use in forming the picture to be displayed.

2. The display device as set forth in claim 1, further comprising:
   a light source for generating the polarized light; and,
   a reflector positioned behind the light source for reflecting portions of the polarized light which are emitted away from the first end face of the optical waveguide, back towards the first end face.

3. The picture display device as set forth in claim 1, wherein the light directing system includes:
   a reflector disposed in spaced-apart, parallel relationship to the major surface of the reflective polarizer which is remote from the picture display panel;
   a diffuser disposed between the reflector and the major surface of the reflective polarizer which is remote from the picture display panel;
   wherein the first portion of the received polarized light which passes through the reflective polarizer is incident upon the diffuser; and,
   wherein a first part of the light incident upon the diffuser is diffused towards the picture display panel for use in forming the picture to be displayed, and a second part of the light incident upon the diffuser is diffused away from the picture display panel; and,
   wherein the second part of the light which is diffused away from the picture display panel is reflected by the reflector towards the picture display panel for use in forming the picture to be displayed.

4. The picture display device as set forth in claim 1, wherein the light directing system comprises a plurality of facets formed in the major surface of the reflective polarizer which is remote from the picture display panel.

5. The picture display device as set forth in claim 4, wherein the facets enclose an angle with respect to the major surface of the reflective polarizer which is remote from the picture display panel.

6. A. The picture display device as set forth in claim 1, wherein the reflective polarizer comprises a cholesteric polarizer.

7. The picture display device as set forth in claim 6, wherein the cholesteric polarizer comprises a single layer of a liquid crystalline polymer material, within which single layer the pitch of the molecular helix varies substantially continuously between first and second values which correspond to lower and upper limits, respectively, of a reflection band required to encompass the full visible wavelength range.

8. The picture display device as set forth in claim 1, further comprising a depolarizing reflector disposed proximate the second end face of the optical waveguide.

9. The picture display device as set forth in claim 3, wherein the diffuser comprises a pattern of discrete diffusing elements formed on the major surface of the reflective polarizer which is remote from the picture display panel.

10. The picture display device as set forth in claim 1, further comprising an $n\lambda/4$ plate disposed between the reflective polarizer and the picture display panel, where n is an odd integer.

11. The picture display device as set forth in claim 10, further comprising an $n\lambda/4$ plate disposed between the reflective polarizer and the picture display panel, where n is an odd integer, wherein the $n\lambda/4$ plate serves as a substrate of the cholesteric polarizer.

12. The picture display device as set forth in claim 1, wherein the reflective polarizer is comprised of a plurality of layers, at least one of which is made of a birefringent material.

13. The picture display device as set forth in claim 1, wherein the reflective polarizer is comprised of a plurality of layers each of which is made of a birefringent material.

14. The picture display device as set forth in claim 1, wherein the reflective polarizer is comprised of a plurality of layers, alternating ones of which are made of a birefringent material.

* * * * *